March 14, 1950  W. H. BASELT ET AL  2,500,232
BRAKE BEAM
Filed Aug. 6, 1945  5 Sheets-Sheet 1
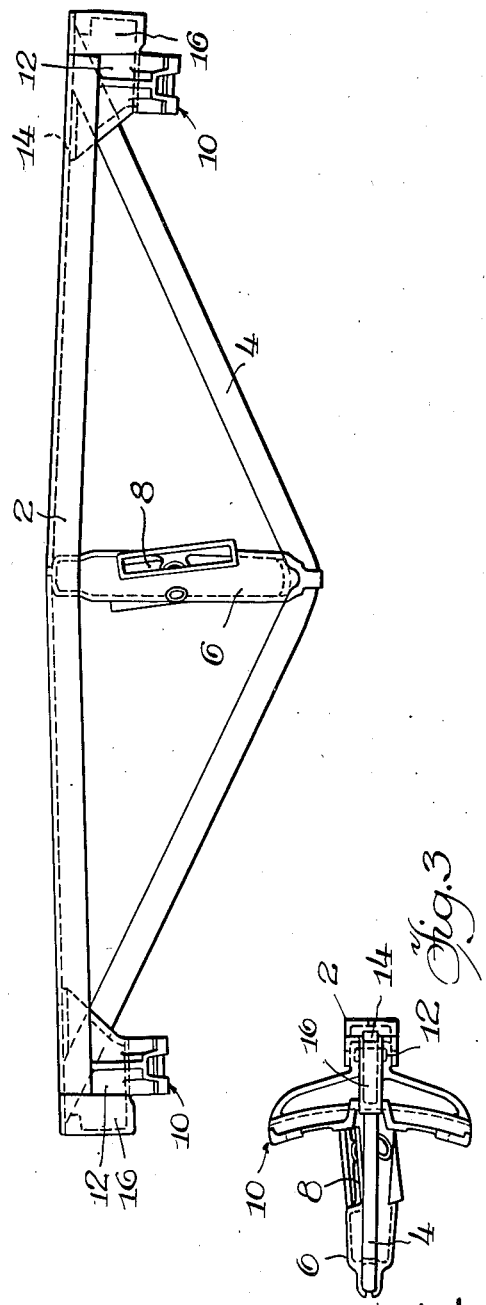
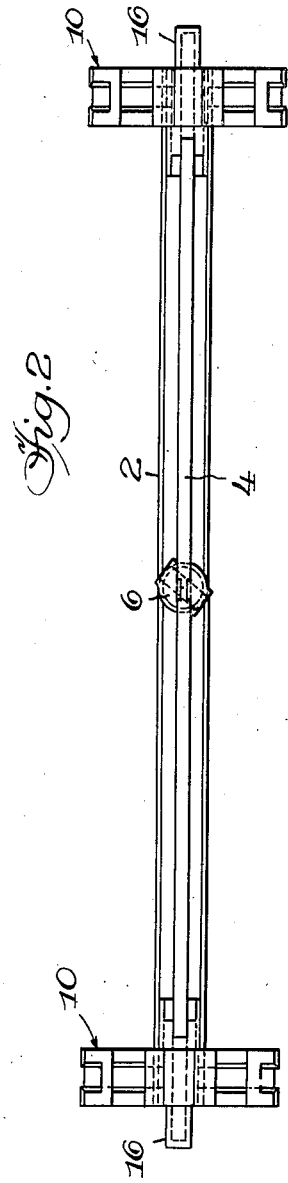
INVENTORS.
Walter H. Baselt
and Loren L. Whitney March 14, 1950     W. H. BASELT ET AL     2,500,232
BRAKE BEAM
Filed Aug. 6, 1945     5 Sheets-Sheet 2
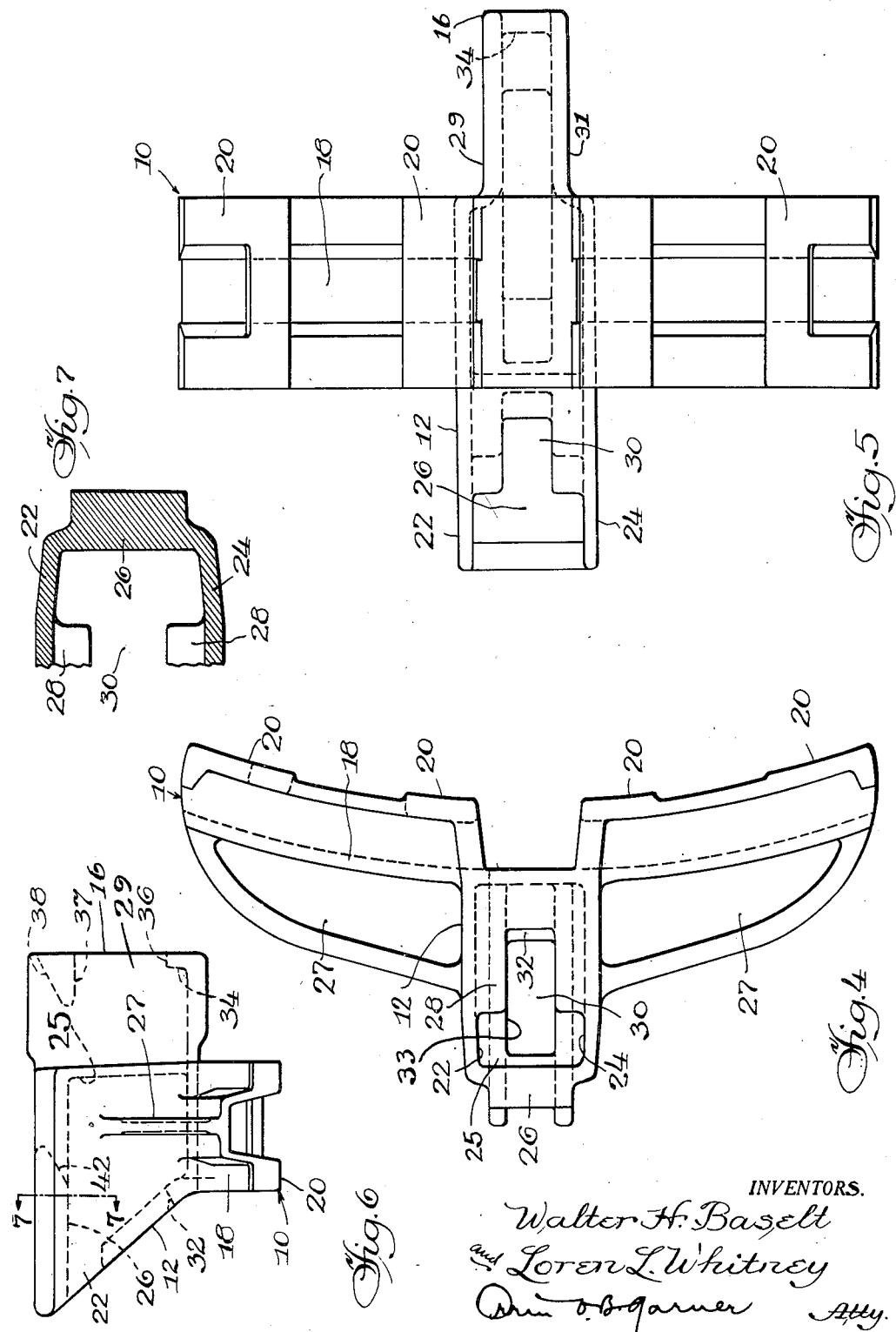
INVENTORS.
Walter H. Baselt
and Loren L. Whitney

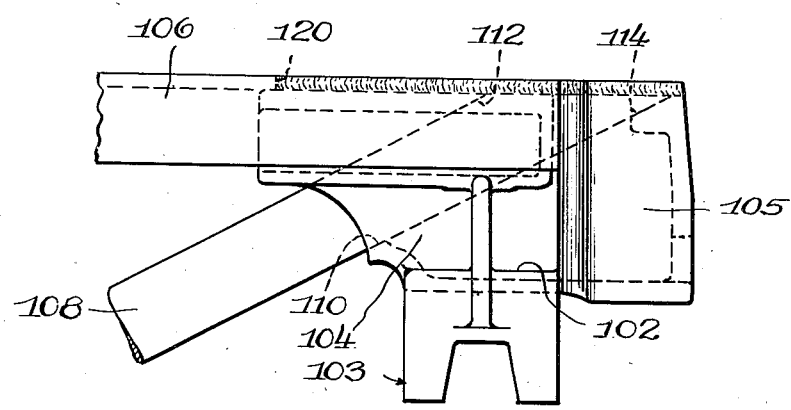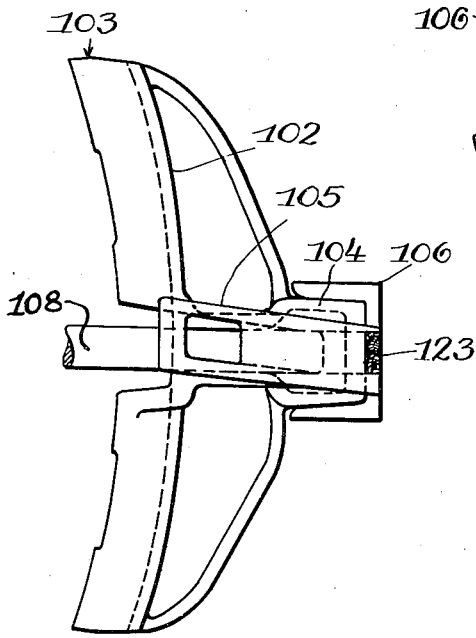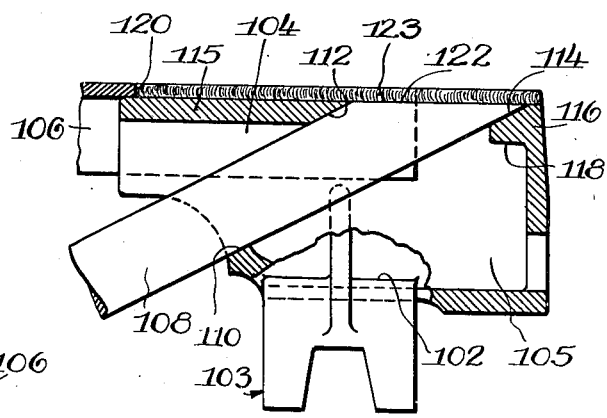

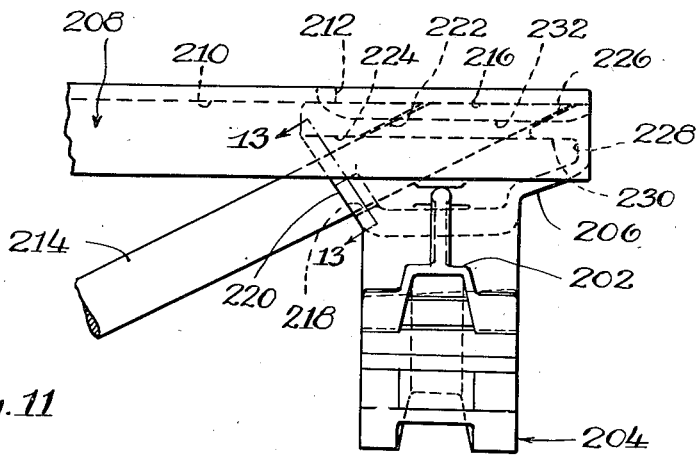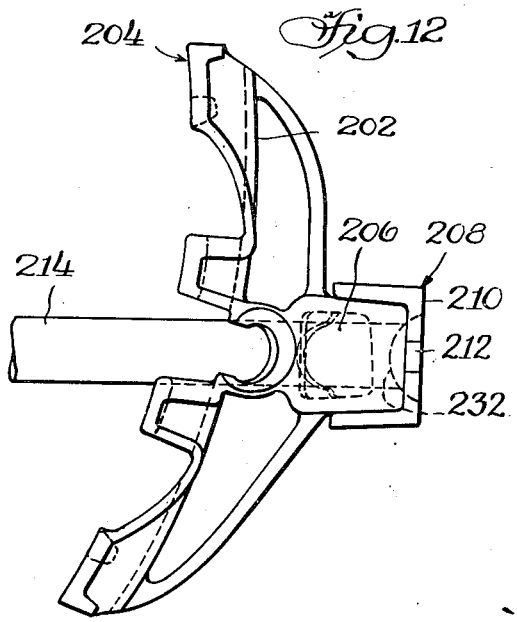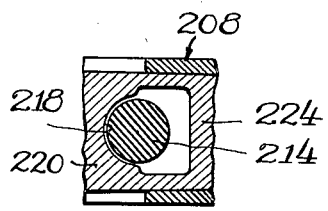

March 14, 1950 W. H. BASELT ET AL 2,500,232
BRAKE BEAM
Filed Aug. 6, 1945 5 Sheets-Sheet 5

INVENTORS.
Walter H. Baselt
and Loren L. Whitney.
Owen B. Garner Atty.

Patented Mar. 14, 1950

2,500,232

UNITED STATES PATENT OFFICE 2,500,232

BRAKE BEAM

Walter H. Baselt, Chicago, Ill., and Loren L. Whitney, Hammond, Ind., assignors to American Steel Foundries, Chicago, Ill., a corporation of New Jersey Application August 6, 1945, Serial No. 609,274

29 Claims. (Cl. 188—223.1)

This invention relates to brake beams and more particularly to a novel fabricated truss type brake beam adapted for utilization in the brake rigging of a railway car truck.

A general object of the invention is to provide a novel fabricated beam of the above described type wherein all of the parts are welded together to form a relatively light structure capable of resisting the loads to which such a beam is subjected under railway service conditions.

A more specific object of the invention is to design a brake beam structure such as above described wherein each brake head is provided with a portion fitted within a channel or U-section compression member, the tension member of the beam being extended through a diagonal passage in a brake head and being welded to the rear web of the compression member through a longitudinal slot therethrough.

Still another object of the invention is to design a truss type brake beam structure wherein each end of the tension member is sheared to afford a good seat therefor against the rear web of the compression member and to afford a maximum welding area.

Still another object of the invention is to provide a brake beam structure wherein the rear wall of the brake head and the outer extremity of the tension member are seated against the rear web of the compression member and are welded thereto through a slot in said rear web.

In certain embodiments of the invention, the novel brake beam is of the so-called "unit" type wherein the ends of the beam are provided with relatively narrow guide portions adapted for reception within brackets formed on the associated truck frame, and in another embodiment of the invention, the novel beam is of more standard design wherein the brake heads are provided with hanger sockets adapted for connection to associated hangers supported by the truck frame in conventional manner.

The invention comprehends a brake head of novel form comprising a front wall adapted for connection in usual manner to associated friction means, such as a brake shoe, adapted for engagement with the wheel of a railway car truck. The brake head is provided on the rear face of said front wall with a portion adapted to be fitted within the channel-section compression member of the beam, and a diagonal passage is provided through said portion extending to the rear face thereof and adapted to receive an associated brake beam tension member.

The foregoing and other objects and advantages of the invention will become apparent from the accompanying specification and the drawings wherein:

Figure 1 is a top plan view of a brake beam embodying the invention;

Figure 2 is a front elevation of the structure shown in Figure 1;

Figure 3 is an end view of the structure shown in Figure 1;

Figures 4–7 inclusive illustrate in detail the brake head shown in Figures 1–3, Figure 4 being a side elevation of the head, Figure 5 being a front view thereof, Figure 6 being a top plan view thereof, and Figure 7 being a sectional view taken in the plane indicated by the line 7—7 of Figure 6;

Figures 8–10 inclusive illustrate a modification of the invention, Figure 8 being a fragmentary top plan view of the beam, Figure 9 being a fragmentary end view thereof, and Figure 10 being a fragmentary top plan view with portions of the structure broken away to clarify the construction.

Figures 11–13 inclusive illustrate another modification of the invention, Figure 11 being a fragmentary top plan view of the beam, Figure 12 being an end elevation thereof, and Figure 13 being a sectional view taken in the plane indicated by the line 13—13 of Figure 11.

Figure 14:
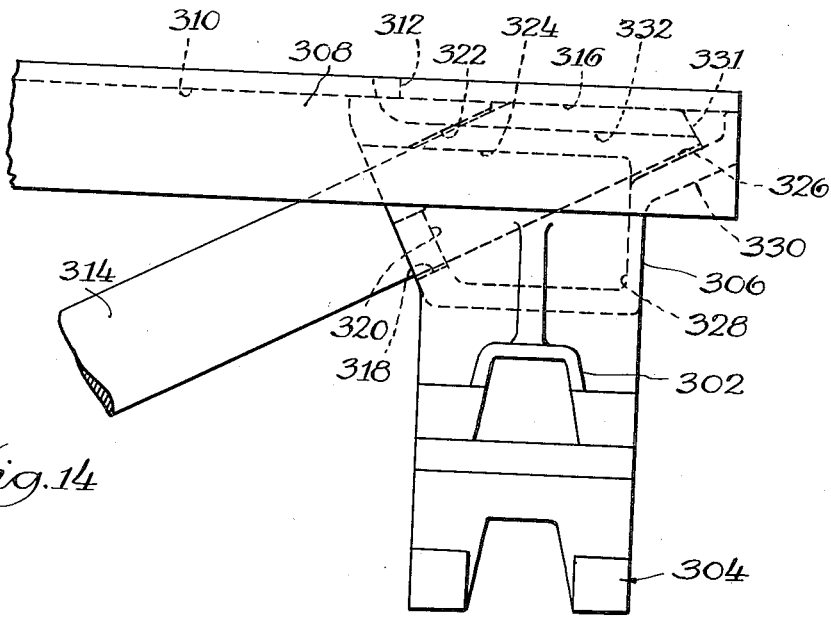
Figure 15:
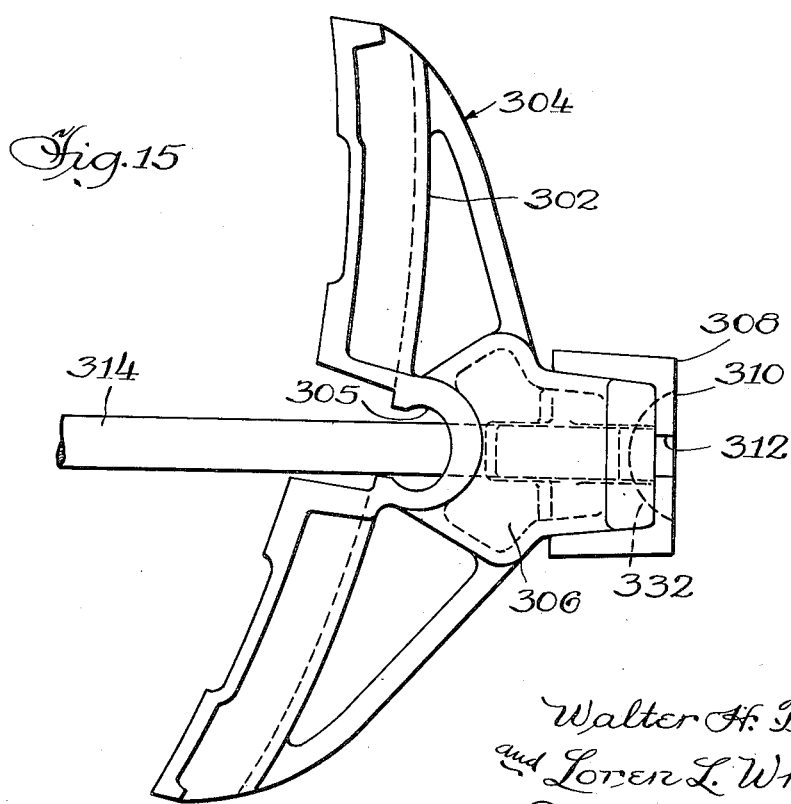

Figures 14 and 15 illustrate another modification of the invention, Figure 14 being a fragmentary top plan view of the beam, and Figure 15 being a fragmentary end view thereof.

Describing the invention in detail and referring first to the embodiment thereof illustrated in Figures 1–7 inclusive, the beam comprises a channel or U-section compression member 2, a tension member 4 and a fulcrum 6 connected therebetween, said fulcrum being slotted as at 8 to accommodate an associated brake lever (not shown).

Each end of the beam is provided with a brake head 10 comprising a box-section portion 12 fitted within the channel-section compression member 2 and welded thereto through a slot 14 in the rear web thereof, the outer end of said portion 12 being preferably offset to provide a relatively narrow guide portion 16 adapted for reception within a guide bracket of an associated truck frame (not shown).

The brake head is shown in detail in Figures 4–7 inclusive and comprises a front transverse wall 18 with integrally formed lugs 20, 20 adapted for connection in usual manner to an associated brake shoe (not shown). Integrally formed with the front wall 18 is the before-mentioned box-section portion 12 comprising top and bottom walls 22 and 24 and a rear web or wall 26. Vertical ribs 27 extend between the wall 18 and the top and bottom walls 22 and 24.

The inner ends of the walls 22 and 24 are connected by an end wall 28 which is slotted as at 30 to accommodate the before-mentioned tension member 4 which bears against a diagonal guide surface 32 (Figure 4) formed at the forward end of the slot 30. The outer ends of the top and bottom walls 22 and 24 are connected to an outboard end wall 25 from which top and bottom walls 29 and 31 of the boss 16 project to merge with a wall 34 of the boss 16, which wall 34 is preferably cored out at 36 for convenient foundry practice.

The rear extremity of the wall 34 is provided with a lug 37 having a diagonal surface 38 coplanar with the surface 32 and adapted to guide the outer end of the tension member 4 which projects through a slot or opening in the rear wall 26 affording a socket extending between the walls 29 and 31 of the boss 16, said socket being defined at its outer end by the guide surface 38 and at its inner end by the diagonal guide surface 42 (Figure 6) which is parallel to the before-mentioned guide surfaces 32 and 38 and affords a bearing area for engagement with the tension member 4.

As best seen in Figure 4, the outboard end wall 25 of the brake head portion 12 is provided with an opening 33 of the same depth as the space between the walls 29 and 31 of the boss 16, whereby the tension member 4, as best seen in Figure 1, projects through the opening 33 of the wall 25 into the socket defined by the walls 29 and 31 and the surface 38.

It may be noted, as best seen in Figure 1, that the outer end of the tension member 4 is diagonally sheared with respect to its longitudinal center line to afford a maximum welding area substantially greater than the normal cross-sectional area of the tension member taken at right angles to its longitudinal center line. This diagonally formed surface affords a good seat for the tension member against the rear web of the compression member 2, said rear web being welded to the tension member 4 and to the rear wall 26 of the brake head through the slot 14. The diagonally sheared surface of the tension member 4 is also welded outwardly of the compression member 2 to the brake head wall 26.

It will be understood that the outboard extremity of the tension member which extends outboardly beyond the vertical plane defining the outboard edge or margin of the front wall 18 is adapted to afford emergency support for the beam in the event that the guide portion 16 accidentally breaks in service.

Figures 8–10 inclusive illustrate a modification of the invention wherein the front wall 102 of the brake head 103 is provided on its rear surface with a box-section portion 104, the outer end of which is relatively narrow to afford an inclined guide portion 105 adapted for reception within the guide bracket of an associated truck frame (not shown). The box-section portion 104 is fitted within the channel-section compression member 106 in abutment with the rear web thereof, and the tension member 108 extends through a diagonal passage through the portion 104 and bears against the diagonal guide surface 110 at the inner end of said passage and against the diagonal guide surfaces 112 and 114 at the outer end of said passage, the surface 112 being formed on the rear wall 115 of the brake head and the surface 114 being formed on the outer end wall 116 of the brake head. The outer wall 116 is provided with a lug 118 to increase the bearing area of the surface 114. The rear web of the compression member 106 is provided with a slot 120 through which the rear wall 115 and the sheared end 122 of the tension member 108 are welded at 123 to the rear web of the compression member, the end 122 of the tension member being additionally welded to the brake head outwardly of the compression member 106, thereby affording a relatively rigid structure.

Figures 11–13 inclusive illustrate another modification of the invention wherein the front wall 202 of the brake head 204 is formed on the rear surface of said wall with a box-section portion 206 fitted within the channel-section compression member 208 in abutment with the rear web 210 thereof, said web being slotted as at 212 to accommodate a weld, as hereinafter discussed. The tension member 214 extends through a diagonal passage through the box-section portion 206, and the sheared end of the tension member is seated as at 216 (Figure 11) against the rear web 210 of the compression member. In this embodiment of the invention, the tension member 214 is formed of round bar stock and is guided by a diagonal socket or slot 218 in the inner end wall 220 of the box-section portion 206. The member 214 is also guided by the diagonal surface 222 defining an edge of the passage through the rear wall 224 of the portion 206, and the tension member is also guided by the diagonal surface 226 on the outer end wall 228 and the lug 230 thereon. The tension member 214 and the rear wall 224 of the brake head are welded to the rear web 210 of the compression member through the slot 212 therein, and it may be noted that during the welding process, the wall 224, the web 210 and the tension member 214 are fused together as indicated by the dotted line at 232 (Figures 11 and 12).

Figures 14 and 15 illustrate another modification of the invention somewhat similar to that of Figures 11–13 except that the tension member is rectangular in cross section and the construction of the beam is somewhat modified to afford a relatively short beam.

In the modification of Figures 14 and 15, the front wall 302 of the brake head 304 is provided with a hanger socket 305 and boxlike portion 306 fitted within the channel section compression member 308 in abutment with the rear web 310 thereof, said web being slotted as at 312 to accommodate a weld as hereinafter discussed. The tension member 314 extends through a complementary diagonal passage through the brake head portion 306, and the sheared end of the tension member is seated as at 316 (Figure 14) against the rear web 310 of the compression member. In this embodiment of the invention the tension member 314 is guided by a diagonal slot 318 defining the inner end of the before-mentioned passage through the inner end wall 320 of the boxlike portion 306. The tension member is also guided by the diagonal surface 322 defining an edge of the before-mentioned passage through the rear wall 324 of the portion 306, and the tension member is also guided by the diagonal surface 326 on the outer end wall 328 and the outwardly extending lug 330 thereof.

The outer end of the tension member 314 is cut off as at 331 to shorten the beam structure and to define a weld pocket outboard the member 314, and the tension member 314, as well as the wall 324 of the brake head, is welded to the rear web 310 of the compression member through the slot 312 therein. It may be noted that during the welding process the wall 324, the web 310 and the tension member 314 are fused together as indicated by the dotted line at 332, thereby affording a relatively strong structure in which the brake head, the tension member, and the compression member are united to form an integral brake beam structure.

It may be noted that in the embodiment of Figures 14 and 15, as well as the embodiment of Figures 11–13, the tension and compression members extend outboardly beyond the vertical plane defining the outboard edge of the front brake head wall to afford emergency support for the beam in the event that associated hanger means (not shown) such as, for example, that received within the hanger socket 305 fail in service.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. A brake beam comprising a brake head with a front wall having brake shoe support means on the forward surface thereof, a box-section portion on the rear face of said wall comprising top and bottom webs, inboard and outboard end walls, and a rear wall extending between said webs, a compression member housing said portion and bearing against external surfaces of said webs and said rear wall, a diagonal slot through one of the end walls, a diagonal slot through the rear wall partly defined by a lug on the other end wall, and a brake beam tension member extending through said slot and welded to said rear wall and to said compression member.

2. A brake beam comprising a brake head with a front wall adapted to support associated brake shoe means on the forward surface thereof, a box-section portion on the rear face of said wall comprising top and bottom webs, inboard and outboard end walls, and a rear wall, a compression member housing said portion and bearing against external surfaces of said webs and said rear wall, a diagonal slot through one of the end walls, a diagonal slot through the rear wall partly defined by a lug on the other end wall, and a brake beam tension member extending through said slots and having a diagonally sheared end surface welded to the compression member.

3. A brake beam comprising a brake head with a front wall adapted to support associated brake shoe means on the forward surface thereof, a box-section portion on the rear face of said wall comprising top and bottom webs, inboard and outboard end walls, and a rear wall, a diagonal slot through the inboard end wall, a diagonal slot through the rear wall partly defined by a lug on the outboard end wall, a brake beam tension member extending through the slot in the inboard wall and into the slot in the rear wall, said tension member being of substantially uniform cross section from end to end thereof and having its outboard end sheared diagonally to its longitudinal center line to present a relatively great weld area within the last-mentioned slot, and a compression member welded to the rear wall and to said area.

4. A brake beam comprising a brake head with a front wall adapted to support associated brake shoe means on the front face thereof, a box-section portion on the rear face of said wall comprising top and bottom webs, a rear wall, and an outboard end wall extending between said webs, a slot through the rear wall partly defined by a lug on the outboard wall presenting a diagonal bearing surface, a tension member extending between said webs and into said slot and having a portion seated against said surface, and a compression member welded to the rear wall and to the portion of said tension member in said slot.

5. In a brake head, a front wall, a box-section portion on the rear face thereof comprising top and bottom webs, a rear wall extending therebetween and end walls connected to said webs at opposite ends thereof, a diagonal slot through one of said end walls, and a diagonal slot through said rear wall partially defined by a lug on the other end wall, said slots being aligned and being adapted to receive an associated brake beam element.

6. A fabricated railway brake beam comprising a brake head having a front wall adapted to support associated brake shoe means, a box-section portion formed on the rear face of said front wall, said portion having a rear wall, top and bottom webs connected thereto, and inboard and outboard walls connected between said webs, a brake beam comprising a compression member bearing against the rear wall, and a tension member of substantially uniform cross section from end to end thereof extending substantially rectilinearly through slots in the inboard and rear walls and having an outboard welding surface formed diagonal to its longitudinal center line to afford a welding area greater than the normal cross-sectional area perpendicular to its longitudinal center line, the slot through said rear wall being partly defined by a lug on the outboard wall having a surface extending between said webs diagonally with respect to the rear wall, said last-mentioned surface affording a seat for the tension member, said welding surface being welded to the rear wall and to the compression member.

7. A fabricated railway brake beam comprising a brake head having a front wall adapted to support associated brake shoe means, a box-section portion formed on the rear face of said front wall, said portion having a rear wall, top and bottom webs connected thereto, and inboard and outboard walls connected between said webs, a brake beam comprising a compression member bearing against the rear wall, and a tension member of substantially uniform cross section from end to end thereof extending substantially rectilinearly through slots in the inboard and rear walls and having an outboard welding surface formed diagonal to its longitudinal center line to afford a welding area greater than the normal cross-sectional area perpendicular to its longitudinal center line, the slot through said rear wall being partly defined by a lug on the outboard wall having a surface extending between said webs diagonally with respect to the rear wall, said last-mentioned surface affording a seat for the tension member, said welding surface being welded to the rear wall and to the compression member, the outboard end of said tension member extending outboardly beyond the outboard margin of said front wall to afford emergency support means for the beam.

8. A brake beam comprising a brake head having a front wall adapted to support associated brake shoe means and having a box-section portion on its rear face defined by top and bottom webs, a rear wall, and an outboard end wall, a diagonal slot through the rear wall partly defined by a lug projecting inboardly from the outboard wall, a tension member extending into said slot, and a compression member welded to the rear wall and to a portion of the tension member within said slot.

9. A brake beam comprising a brake head having a front wall adapted to support associated brake shoe means, said wall having a box-section portion on its rear face defined by top and bottom webs, a rear wall, and an outboard end wall, a slot through the rear wall partly defined by a lug on the outboard wall projecting outboardly therefrom, a tension member extending into said slot, and a compression member welded to the rear wall and to the tension member in said slot.

10. A brake beam comprising a brake head having a front wall with a hanger socket, said wall being adapted to support associated brake shoe means and having a box-section portion on its rear face defined by top and bottom webs, a rear wall, and an outboard end wall, a slot through the rear wall partly defined by a lug on the outboard wall extending outboardly therefrom, a tension member extending into said slot and bearing against said lug, and a compression member welded to the rear wall and to the tension member in said slot, both of said members projecting outboardly of the outboard margin of said front wall to afford emergency support means for the beam.

11. A brake beam comprising a brake head having a front wall with a hanger socket, said wall being adapted to support associated brake shoe means and having a box-section portion on its rear face defined by top and bottom webs, a rear wall, and an outboard end wall, a slot through the rear wall partly defined by an outboardly projecting lug on the outboard wall, a tension member extending into said slot, and a compression member bearing against the rear wall and welded thereto and to the tension member in said slot, at least one of said members extending outboardly beyond the outboard margin of said front wall.

12. A brake beam comprising a brake head having a front wall adapted to carry associated brake shoe means on its front face, a box-section portion on the rear face of said front wall having top and bottom walls with offset portions extending outboardly of the outboard edge of said front wall to afford a support extension for the beam, a rear wall connected to said top and bottom walls, an outboard end wall connected to the outboard ends of said top and bottom walls, a slot in the rear wall defined by a diagonal bearing surface on the outboard end wall, a tension member extending between said top and bottom walls and having a portion extending into said slot and seated against said bearing surface, and a compression member welded to said rear wall and to the portion of said tension member in said slot.

13. A brake beam comprising a brake head casting have a front wall adapted to carry associated brake shoe means, a box-section portion on the rear face of said wall having top and bottom walls with offset portions extending outboardly of the outboard edge of said front wall to define a support extension for the beam, a rear wall connected to the top and bottom walls, an outboard end wall connected to the outboard ends of said top and bottom walls, a slot in the rear wall defined by a lug on the outboard end wall affording a diagonal bearing surface, a tension member extending between said top and bottom walls and having a portion extending into said slot and seated against said bearing surface, and a compression member welded to the rear wall and to the tension member.

14. A brake beam comprising a brake head casting having a front wall adapted to carry associated brake shoe means, a box-section portion on the rear face of said wall having top and bottom walls with offset portions extending outboardly of the outboard edge of said front wall to define a support extension for the beam, a rear wall connected to the top and bottom walls, an outboard end wall connected to the outboard ends of said top and bottom walls, a slot in the rear wall defined by a lug on the outboard end wall affording a diagonal bearing surface, a tension member extending between said top and bottom walls and having a portion extending into said slot and seated against said bearing surface, and a generally channel-section compression member having top and bottom webs wearing against external surfaces of said top and bottom walls, and a rear web connecting said top and bottom webs, said webs terminating inboardly of the offset portions of said top and bottom walls, said rear web being welded to the rear surface of said rear wall and to the portion of said tension member in said slot.

15. A brake beam comprising a brake head including a front wall adapted to carry associated brake shoe means on its front face, a box-section portion on the rear face of said front wall having top and bottom webs, and a rear wall, said top and bottom webs having offset portions extending outboardly of the outboard edge of said front wall and defining a relatively narrow support lug, an end wall connected to the outboard ends of said webs, a slot in the rear wall extending to said end wall, a tension member extending between said webs and having a portion extending to said end wall and into said slot, and a compression member welded to said rear wall and to a surface of said tension member in said slot, said portion of said tension member between the offset portions of said webs being adapted to afford emergency support means for the beam in the event of accidental breakage of said lug.

16. A brake beam comprising a brake head including a front wall adapted to carry associated brake shoe means on its front face, a box-section portion on the rear face of said front wall having top and bottom webs, and a rear wall, said top and bottom webs having offset portions defining a relatively narrow support lug extending outboardly of the outboard edge of said front wall, an end wall connected to the outboard ends of said webs, a slot in the rear wall extending to the end wall and partially defined by a lug thereon, said lug presenting a diagonal bearing surface extending inboardly from the end wall and disposed diagonally with respect to the rear wall, a tension member extending between said webs and having a portion bearing against said surface, and a compression member welded to the rear wall and to the tension member, the portion of said tension member between the offset portions of said webs being adapted to afford emergency support means for the beam in the event of accidental breakage of said lug, said tension member being of substantially uniform cross section from end to end thereof.

17. In combination, a brake head comprising a front wall, a box-section portion on the rear face thereof comprising top and bottom webs, a rear wall extending between said webs, and end walls connected to said webs at opposite extremities thereof, a diagonal slot through one of said end walls, a diagonal slot through said rear wall partially defined by a lug on the other end wall, a brake beam element extending rectilinearly through said slots, and another brake beam element secured to the portion of the first-mentioned element extending from the last-mentioned slot.

18. In a fabricated truss type railway brake beam, a brake head with a front portion adapted to support associated brake shoe means, and a rear hollow portion having a rear wall and an outboard end wall with an opening therethrough, a boss on the outboard face of said end wall having a socket communicating with said opening, a U-section compression member having a rear wall bearing against the rear wall of the brake head portion, a tension member received within the compression member and extending through said opening into said socket, and a weld in said socket connecting the tension member to said boss.

19. A brake beam, according to claim 18, wherein the boss is provided with approximately parallel top and bottom surfaces adapted for reception within an associated support structure.

20. A brake beam, according to claim 18, wherein the boss is adapted for reception within an associated support structure to afford support means for the beam, the socket in said boss extending to the rear edge thereof whereby the portion of the tension member in the socket is adapted to afford emergency support means for the beam in the event that the boss becomes broken in service.

21. A brake beam, according to claim 18, wherein the hollow brake head portion is provided with an inboard end wall having a slot complementary to and receiving a portion of the tension member to afford guide means therefor.

22. In a fabricated truss type railway brake beam, a brake head having a front brake shoe supporting portion, and a rear hollow portion comprising a rear wall and an outboard end wall with an opening therethrough, a boss on the outboard face of said end wall having a socket communicating with said opening, a U-section compression member in telescopic relationship with said hollow portion, said compression member having a rear wall bearing against the rear wall of said hollow portion, a tension member received within said hollow portion and said compression member and extending through said opening into said socket, and a weld in said socket connecting the outboard end of the tension member to said boss.

23. A truss type railway brake beam comprising a compression member including a rear web and top and bottom webs extending forwardly therefrom, a brake head member having a portion in telescopic relationship with said compression member, a tension element extending between said top and bottom webs and into a slot in one of the members, surfaces on one of the members confining the top and bottom and the inboard surface of the tension element adjacent said rear web, and a weld in said slot.

24. A truss type railway brake beam comprising compression and brake head members, one of said members having a portion housed within a portion of the other member, inboard and outboard diagonal substantially parallel surfaces in the first-mentioned portion defining a diagonal passage therethrough, the rear surface of said first-mentioned portion having a slot communicating with the outboard end of said passage, a tension member extending through said passage along said surfaces and into said slot, and a weld in said slot.

25. A truss type railway brake beam comprising a compression member and a brake head member having portions in telescopic relationship with each other, spaced diagonal surfaces in one of the portions defining a diagonal passage therein, the rear surface of said one portion having a slot communicating with the outboard end of said passage, a tension member extending through said passage along said surfaces and into said slot, and a weld in said slot.

26. A truss type railway brake beam comprising a brake head having a rear wall with a slot therein, said head having a socket communicating with said slot, a compression member sleeved over a portion of said brake head containing a passage, said compression member being spaced inboardly from said socket, a tension member extending through the passage in said portion and into said socket, and a weld in said slot securing said tension member in said socket.

27. A fabricated truss type brake beam comprising a compression member of uniform cross-section from end to end thereof and having top and bottom webs and a rear web, a brake head member, one of said members having a portion received within the other and containing a diagonal passage in said portion terminating in a slot through the rear surface of said one member, said portion comprising a diagonal surface at one side of the passage and other surfaces above and below the passage, a tension element extending through said passage and snugly confined by said surfaces and a weld in said slot securing said members to each other and to said element.

28. A fabricated truss type brake beam comprising a compression member of substantially uniform cross-section from end to end thereof and having top and bottom webs and a rear web extending therebetween, a brake head member, one of said members having a portion received within the other and containing a diagonal passage, said portion comprising a diagonal surface at one side of the passage, a tension element extending through the passage and bearing against the surface and a weld securing the element to the brake head member along a rearwardly facing surface thereof outboardly of the compression member and securing the brake head and compression members to each other.

29. A brake beam comprising a compression member having top and bottom webs and a rear web extending therebetween, a brake head member, one of said members having a portion received within the other, said one member having spaced inboard and outboard diagonal surfaces approximately parallel to each other and partly defining a passage through said one member, a tension element extending through said passage along said surfaces, and a weld connecting said members to each other and to the outboard end of the element.

WALTER H. BASELT.
LOREN L. WHITNEY.

REFERENCES CITED

The following references are of record in the file of this patent:

UNITED STATES PATENTS

| Number | Name | Date |
|---|---|---|
| 1,140,615 | Rohlfing | May 25, 1915 |
| 2,270,610 | Spaeth et al. | Jan. 20, 1942 |
| 2,276,065 | Schaefer | Mar. 10, 1942 |
| 2,356,720 | Aurien et al. | Aug. 22, 1944 |